United States Patent
Hamelbeck

(10) Patent No.: US 6,296,382 B1
(45) Date of Patent: Oct. 2, 2001

(54) MULTI-CHAMBER LAMP FOR VEHICLES

(75) Inventor: Antonius Hamelbeck, Anroechte (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/304,261

(22) Filed: May 6, 1999

(30) Foreign Application Priority Data

May 8, 1998 (DE) .............................. 198 20 656

(51) Int. Cl.⁷ ................................................ B60Q 1/04
(52) U.S. Cl. .................. 362/544; 362/518; 362/520; 362/241; 362/240; 362/247; 362/509; 362/311; 362/235; 362/522; 362/310
(58) Field of Search ................................ 362/544, 518, 362/520, 241, 240, 247, 509, 311, 235, 522, 310

(56) References Cited

U.S. PATENT DOCUMENTS

| | | | |
|---|---|---|---|
| 5,117,335 | * 5/1992 | Yamada | 362/61 |
| 5,169,224 | 12/1992 | Segoshi et al. | |
| 5,353,204 | * 10/1994 | Kawamura | 362/61 |
| 5,394,310 | * 2/1995 | Iwasaki | 362/61 |
| 5,526,239 | * 6/1996 | Sato | 362/66 |
| 5,552,969 | * 9/1996 | Marakami | 362/61 |
| 5,558,423 | * 9/1996 | Schatka et al. | 362/61 |
| 5,685,634 | * 11/1997 | Mulligan | 362/237 |
| 5,692,824 | * 12/1997 | Ooishi | 362/80 |
| 6,095,672 | * 8/2000 | Beninga et al. | 362/545 |
| 6,129,448 | * 10/2000 | Takasaki et al. | 362/543 |
| 6,152,589 | * 11/2000 | Kawaguchi | 362/518 |

FOREIGN PATENT DOCUMENTS

| | | |
|---|---|---|
| 32 24 256 C2 | 1/1983 | (DE) . |
| 37 11 394 A1 | 11/1988 | (DE) . |
| G 90 01 659.9 | 5/1990 | (DE) . |
| 43 36 547 A1 | 9/1994 | (DE) . |
| 44 17 695 C2 | 11/1995 | (DE) . |
| 197 04 267 A1 | 9/1997 | (DE) . |
| 197 37 550 A1 | 3/1998 | (DE) . |
| 00715 83A | 9/1983 | (EP) . |
| 0 340 328 A1 | 11/1989 | (EP) . |
| 0 678 703 A1 | 10/1995 | (EP) . |
| 24870 41A | 1/1982 | (FR) . |

OTHER PUBLICATIONS

Patent Abstracts of Japan, JP 09231813 A, May 9, 1997, Natsume Kazunori, Lamp.

* cited by examiner

Primary Examiner—Stephen Husar
Assistant Examiner—Anabel M Ton

(57) ABSTRACT

A multi-chamber lamp has a lamp housing with a plurality of reflectors. A closure pane is provided on the lamp housing. An intermediate pane, located between the reflectors and the closure pane extends over an entire light emergence plane of at least one reflector. The closure pane as well as the intermediate pane are at least partially free of optical function. The intermediate pane supports a shield device for the light source associated with the at least one reflector, which is surrounded by an optics-free area. A cover apparatus completely encompasses the at least one reflector provided with the intermediate pane and covers also a peripheral rim of the intermediate pane as well as shields an interior of the lamp housing from view from the outside.

12 Claims, 3 Drawing Sheets

MULTI-CHAMBER LAMP FOR VEHICLES

BACKGROUND OF THE INVENTION

This invention concerns a multi-chamber lamp for vehicles, with a lamp housing thereof having a plurality of reflectors, there being a common closure pane for the reflectors, and there being at least one intermediate pane extending over an entire light-emergence plane of at least one of the reflectors.

Such a multi-chamber lamp for vehicles is disclosed by German patent document DE 90 01 659 U1. The multi-chamber lamp has a lamp housing of plastic, a forward opening of which is enclosed by a plastic, light-transmissive, closure pane. A back wall of the lamp housing forms a plurality of bowl shaped reflectors, in each of which respectively, is an opening for receiving a light, as a light source, installed therein. The reflectors border on one another, up to partitions which extend between them. The partitions are molded on the back wall of the lamp housing. Some of the reflectors are commonly covered by an intermediate pane, which extends adjacent to free ends of the partitions, and spaced from the common closure pane. The closure pane and the intermediate pane have optical elements. The common closure pane has arranged on its inside, rectilinearly-shaped retroreflectors, between which light dispersing cylindrical lenses are arranged. The optical elements of the intermediate pane collect parallel-reflected light from the reflectors in such a manner, that the light is directed, bundled, between the rectilinearly arranged retroreflectors and is dispersed by the cylindrical lenses between the retroreflectors. The lights and the light receiver openings are concealed by the optical elements of the closure pane and intermediate pane, and, thus, are not regarded as disturbing when viewed from a forward side of the lamp. A disadvantage of this is, that the optical elements of the closure and intermediate panes have a matte, or dull, surface and thus illumination losses arise through the closure and intermediate pane, and the lamp, when not turned on, appears dull and lacks brilliance. The optical elements can only be produced with a matte surface, since half dies for molding optical elements would lose their exact surface shapes if they were polished.

DE 197 37 55 0 A1 discloses a tail light for vehicles, a housing of which has a single reflector. The lamp housing, on its forward side, is enclosed by a light-transmissive closure pane. This closure pane is made to be optics-free and permits a clear view of a reflecting surface of the reflector. The reflecting surface of the reflector has a facet-like structured surface. A light is in a central opening of the bowl shaped reflector, serving as a light source. The facet-like surface of the reflector diverts light from the light source in a desired direction and past a lamp cover arranged directly in front of the light source. The lamp cover is made of transparent plastic and is constructed from a retroreflector. The retroreflector is secured on the lamp housing by two laterally protruding clips. The clips, which serve as holders for the retroreflector, when looking into the interior of the light, extend inside in front of the reflecting surface of the reflector and are thus disturbing for a harmonic total impression of the tail light.

Thus, it is an object of this invention to provide a multi-chamber lamp for vehicles, of a type described in the opening paragraph above, in which light losses through closure and intermediate panes become as small as possible and light emergence planes of reflectors can be made optionally independent of one another in their shapes; and, even with an uncomplicated structure for the lamp, areas surrounding the reflectors and one of the light sources neighboring the intermediate pane are blocked to the greatest extent from outside viewing, without a holding means serving for this blocking disturbing a harmonic appearance of the lights.

SUMMARY OF THE INVENTION

According to principles of this invention, not only a closure pane, but also an intermediate pane, at least in partial areas thereof, are made to be optics-free, with the intermediate pane supporting a center shield device for a light source corresponding to its reflector, with the center shield device being encompassed by an optics-free area and at least the reflector corresponding to the intermediate pane being completely surrounded by a cover apparatus, which blocks off an interior of the lamp housing and an outer, peripherally-extending rim of the intermediate pane against being viewed from outside.

BRIEF DESCRIPTION OF THE DRAWINGS

The invention is described and explained in more detail below using an embodiment shown in the drawings. The described and drawn figures can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner. In this respect.

DETAILED DESCRIPTION OF THE INVENTION

Figure 1:
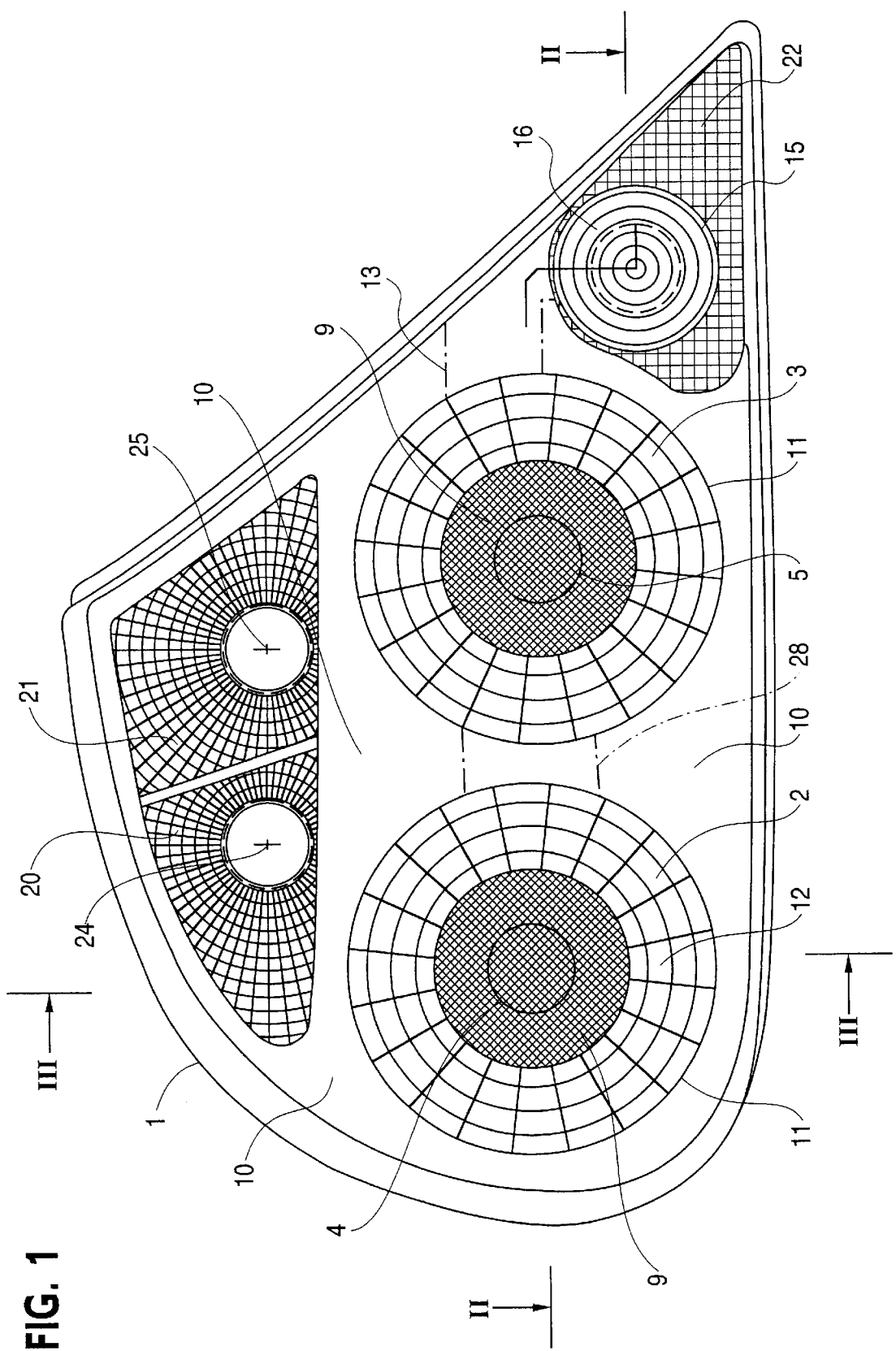
FIG. 1 is a front view of a multi-chamber lamp of this invention for vehicles particularly designed to be installed on a rear of a vehicle.
Figure 2:
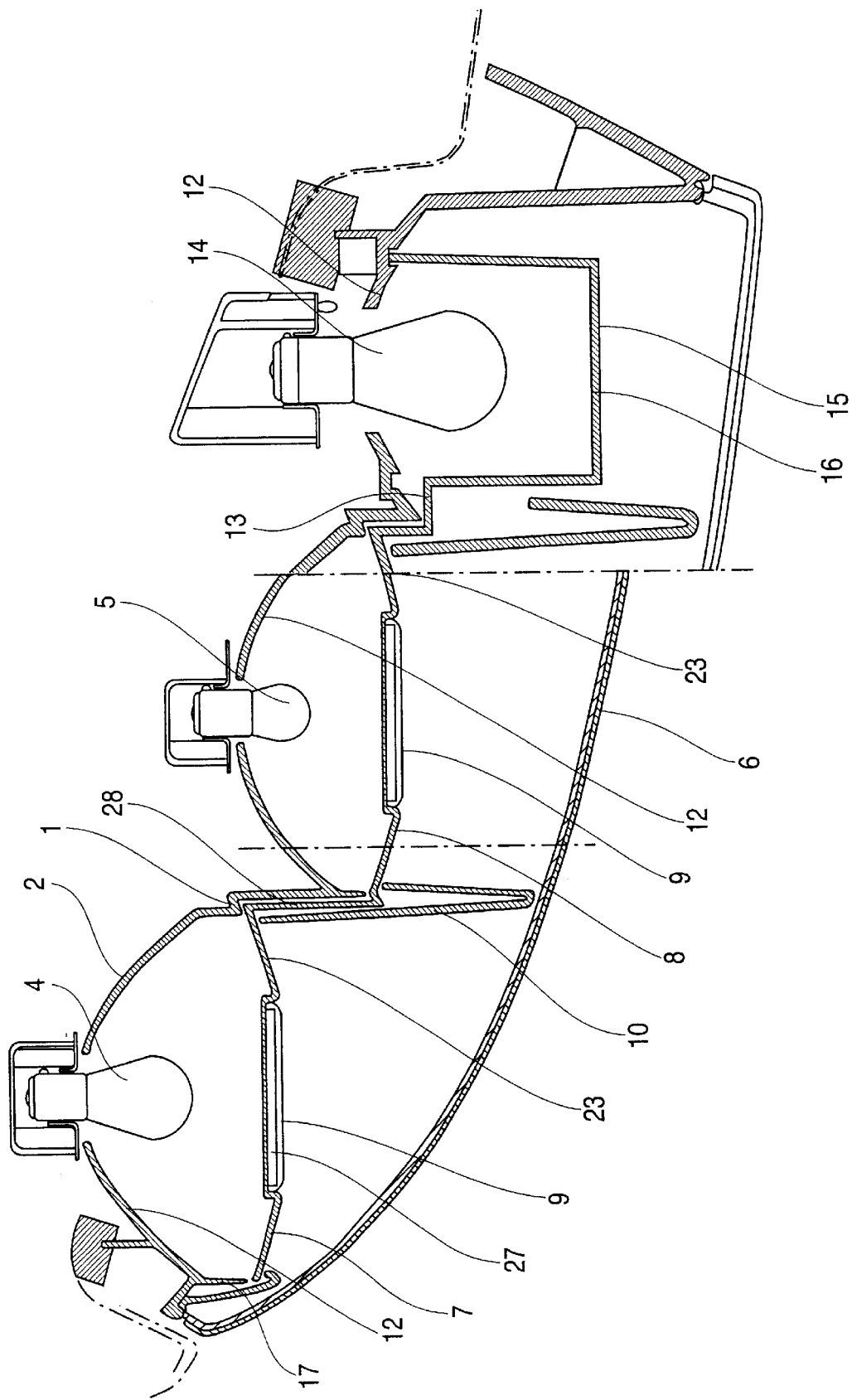
FIG. 2 is a cross-sectional view taken on line II—II in FIG. 1.
Figure 3:
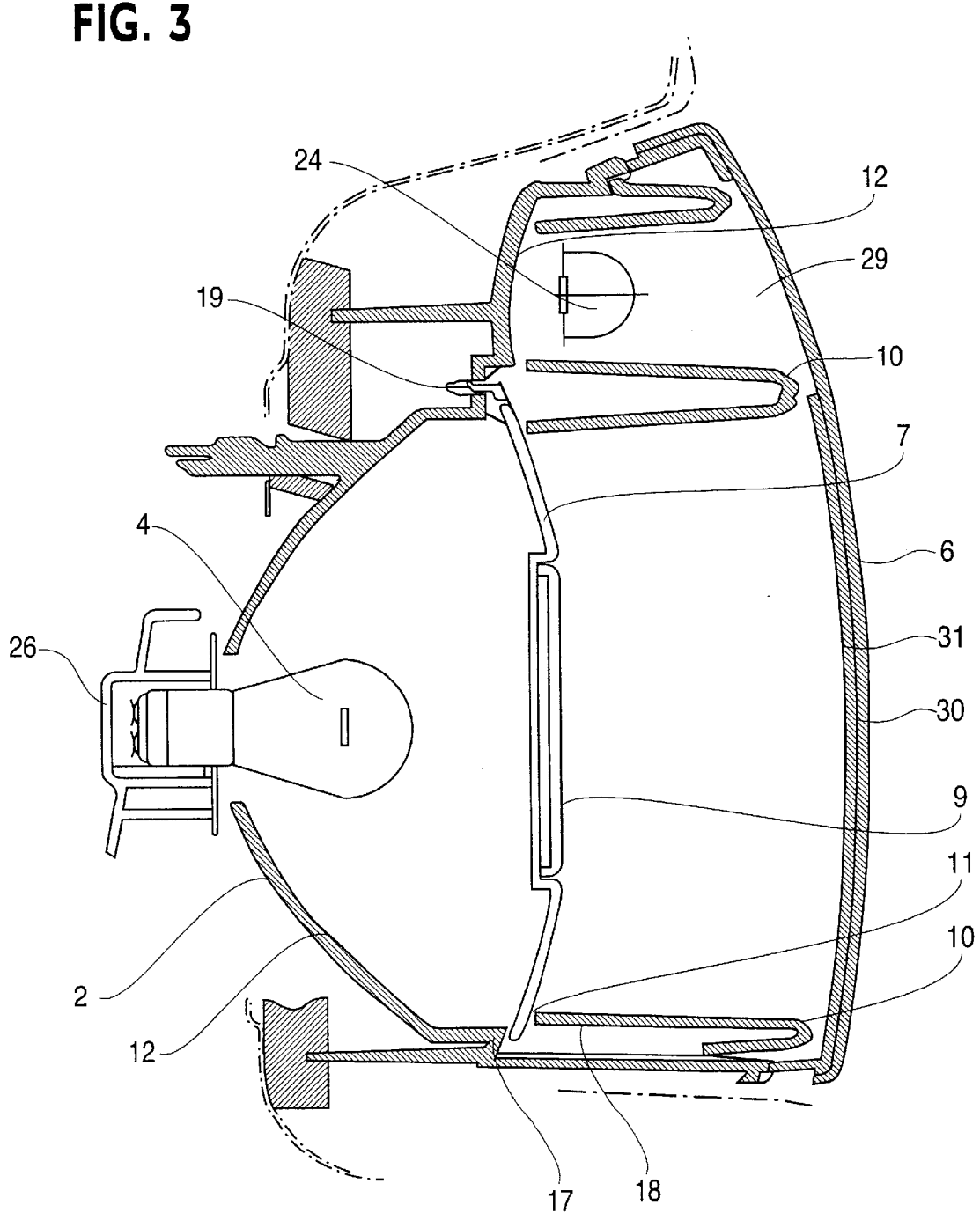
FIG. 3 is a cross-sectional view taken on line III—III in FIG. 1.

A multi-chamber lamp for vehicles has a lamp housing 1, a forward opening of which is closed by a light-transmissive closure pane 6. This closure pane 6 is sealingly welded to a peripheral outer rim of the lamp housing 1. A back wall of the lamp housing 1 forms bowl shaped reflectors 2, 3, 20, 21, 22 which are provided with a facet-like structured reflective areas 12. The reflective areas 12 are provided with a reflecting surface. Light sources 4, 5, 14, 24, 25, in the form of lights, are respectively arranged within the bowl shaped reflectors 2, 3, 20, 21, 22 by being inserted through reflector openings and are secured in receptacles 26 at a rear side of the lamp housing 1.

The reflectors 2, 3 are circularly structured at their light-emergent areas, or planes 11, and are surrounded in a direction of emerging light, by a forward rim 17 of the lamp housing 1. The reflectors 2, 3 are each covered by a circular, light-transmissive, intermediate pane 7, 8. The intermediate panes 7, 8 respectively have in their central areas center shield devices 9. Each center shield device 9 is formed as a retroreflector. The retroreflector is comprised of a bowl-shaped, circular plate, whose circumferential rim lies on a base of a recess 27 corresponding thereto, which is impressed in a side of the intermediate pane 7, 8 facing the closure pane 6. The plate with the optics system of the retroreflector 9 is sealingly welded to the intermediate pane 7, 8. Each of the intermediate panes 7 and 8 has a circular optics-free area 23 disposed circumferentially about the center shield device 9. Outer circumferential rims of these circular areas border the forward rim 17 of the lamp housing 1 surrounding the reflectors 2, 3. The closure pane 6 and the optics-free annular areas 23 of the intermediate panes 7, 8, have smooth front and back sides. Because of this, the facet-like structured reflective surfaces 12 of the reflectors 2, 3 are clearly seen through the closure pane 6 and the annular areas 23 of the intermediate panes 7, 8. Thus, these two reflectors 2, 3, in a switched-off condition of the lights, present a brilliant appearance, and the lights 4, 5 are covered by the center shield devices 9, without the optics-free areas 23, which serve as retainers, disturbing operation of the intermediate panes 7, 8. The reflectors 2, 3 provide tail light, while the reflector 3 additionally provides brake light. Above the two reflectors 2, 3, the lamp housing 1 has the reflectors 20, 21. The reflector 20 serves to provide back-up light and the reflector 21 for blinker light. The triangularly shaped reflector 22 is arranged laterally, beside the two reflectors 2, 3, in an acute angle of the lamp housing 1. The light source 14, corresponding to the reflector 22, is encapsulated in a light-transmissive light hood 15. The light hood 15 has on its top surface a hood shield 16 formed of optical system elements. The optical elements of the hood shield 16 direct light emerging immediately out of the light source 14. The reflector 22 and the optical elements of the light hood shield 16 provide a fog tail light. The light hood 15 is connected by a connection piece 13, as one piece, with the intermediate pane 8, while the intermediate panes 7, 8 are bound together as one piece by a connection piece 28. A cover apparatus 10 is arranged between the closure pane 6 and the reflectors 2, 3, 20, 21, 22, and the intermediate panes 7, 8. The cover apparatus 10 is made as a frame-like cover which is of plastic and respectively forms circular openings for the reflectors 2 and 3. One of two backward turned rims 18 of the frame-like cover apparatus 10 bordering the two openings extends beside the forward side of the optics-free area 23 of the intermediate pane 7 or 8. The cover apparatus 10 extends, starting from the backward turned rim 18, nearly to an inner side of the closure pane 6. An outer side of the cover apparatus 10 has a reflecting surface. The cover apparatus 10 has, above the reflectors, 2, 3 a common opening for the immediately-adjacent reflectors 20, 21. An outer rim of the cover apparatus 10 extends to the area of the reflector 22, up to an outer rim of the lamp housing 1, and thereby covers areas between the reflectors 2, 3, 20, and 21 and between the reflectors 2, 3, 20 and 21 and the outer rim of the lamp housing. The cover apparatus 10 extends to the light hood 15 corresponding to the reflector 22 and thereby borders a side of the reflector 22, while two other sides of the triangular reflector 22 are bordered by the outer rim of the lamp housing 1.

The cover apparatus, together with the reflectors 2, 3, 20, 21, at least in partial areas around the forward rim 17 of the lamp housing 1, forms a separating apparatus between individual light chambers of the lamp. The closure pane 6 and the intermediate panes 7 and 8 are self secured by holding elements 19 onto the rear side of the lamp housing 1. The intermediate panes 7, 8 and the light hood 15 and/or the closure pane 6 can serve as a filter. An incandescent light 25 for the blinker light has a yellow colored glass bulb. The closure pane 6 has, in the area of the reflectors 20, 21, a window 29 without a filter function. The closure pane, up to the window 29, is comprised of two layers 30, 31. The layers 30, 31 are sprayed onto one another, with the layer 30 being an external coating, glass clear, and without a filter function, while the layer 31 is a substrate on the inside of the closure pane 6 and is colored red.

The closure pane and the intermediate pane over each reflector, at least in the area surrounding the shield device, can be finished on both the front and back sides with smooth surfacing. By this means, reflected light beams from the reflector suffer the least amount of loss upon passing through the intermediate and closure panes. Additionally, looking through the smooth intermediate and closure panes from the forward side of the lamp, the reflecting surface of the reflector is clearly visible. Such a light has, in its turned-off condition, a brilliant appearance. The optics-free area of the intermediate pane which surrounds the shield device serves to hold the shield device, which, in turn, serves to cover the light source and the light-receiving opening. In this regard, the shield device should be arranged directly in front of the light source.

Although the closure pane is designed to be optics-free, neither the outer rim of the intermediate pane, nor areas between the reflectors are disturbing to the eye, since these are blocked off by the cover apparatus.

The light source, corresponding to the shield device, is also well covered from an angled view into the interior of the light, if the optics-free area of the intermediate pane is apportioned in the most uniform way around the center shield device. This is achieved by arranging the shield device in a central area of the light pane and having its outer, peripheral edge correspond to the configuration of the backward-turned rim of the cover apparatus which borders on the intermediate pane.

The intermediate pane is securely held in the interior of the lamp housing, by having the rear side of the intermediate pane extend to a forward rim of the lamp housing, which encompasses the reflector and by having its forward side extend adjacent the backward-turned rim of the cover apparatus. In this way, the intermediate pane is held with the least possible play between the housing and the cover apparatus.

In the case of two neighboring intermediate panes, it is advantageous, for these to be constructed of one piece of material and to be respectively peripherally encompassed by the cover apparatus. In this manner, the intermediate panes are economical to produce and mounting is simple and quickly accomplished. In this regard, it is of further advantage for an intermediate pane to be formed as one piece with a light-source-receiving hood via a connection piece, with the connection piece being obscured by the cover apparatus and with at least a top surface of the light hood having a shield device. Use of a light hood is especially advantageous when the cover apparatus itself extends up to the light hood so that the connection piece is completely covered by the cover apparatus.

Furthermore, it is advantageous, for the hood shield of the light hood and the shield device of the intermediate pane to be constructed of optical elements. The optical elements can collect or disburse light emerging directly from the light source, or can form a retroreflector.

In the case of a facet-like structured reflecting surface of the reflectors, the lights serving as light sources cannot be recognized as mirror images in the reflecting surface.

In a particularly advantageous embodiment of the invention, the rim-like cover apparatus between the reflectors and the closure pane serves as the cover apparatus. The rim-like cover apparatus can be provided with a reflecting surface on its forward surface, similar to that of the reflectors. The surface of the cover apparatus can also be made to match a coloring of the vehicle. In this connection it is further practical that the intermediate pane as well as the cover apparatus are provided with holding elements which are self affixing, or snapping, to the lamp housing. The holding elements may be of spring-like detention arms which engage automatically with openings in the backside of the housing for the detention arms. When the closure pane is placed on the lamp housing and welded thereto, the cover part can be simultaneously welded to the lamp housing.

What is claimed is:

1. A multi-chamber lamp for vehicles comprising: a lamp housing having a plurality of reflectors, a common closure pane for the reflectors and at least one intermediate pane which extends over an entire light-emergence area of at least one of the reflectors, wherein at least partial areas of the closure pane as well as the at least one intermediate pane are smooth optics-free areas, free of optical functions so as to pass light therethrough without substantially modifying the light to thereby allow a reflection surface of the at least one of the reflectors to be clearly seen therethrough, the at least one intermediate pane supporting a shield device for a light source of the at least one reflector and surrounding the shield device with the smooth optics-free area of the intermediate pane, wherein the at least one reflector is fully surrounded by a cover apparatus which shields an outer peripheral rim of the smooth optics-free area of the at least one intermediate pane and shields an interior of the lamp housing from being viewed from outside the lamp housing;

wherein the shield device is positioned in a central area of the at least one intermediate pane, with the shield device's outer peripheral rim corresponding in shape to a configuration of a backward-turned rim, extending toward the reflectors, of the cover apparatus bordering on the intermediate pane.

2. A multi-chamber lamp as in claim 1, wherein the at least one intermediate pane is situated with its rear side bordering a forward, peripheral, rim of the at least one reflector, and with its forward side bordering a backward turning rim, turning toward the reflector, of the cover apparatus.

3. A multi-chamber lamp as in claim 1, wherein there are at least two neighboring intermediate panes, each respectively corresponding to a reflector, said at least two neighboring intermediate panes being constructed as one piece, and being respectively surroundingly encompassed by the cover apparatus.

4. A multi-chamber lamp as in claim 1, wherein said at least one intermediate pane is made as one piece with a connection piece and a light-source-encapsulating light hood, with the connection piece being covered by the cover apparatus and at least an outer surface of the light hood having a shielding arrangement.

5. A multi-chamber lamp as in claim 1, wherein the shield device carried by the at least one intermediate pane is formed of optical elements.

6. A multi-chamber lamp as in claim 1, wherein the shield device is constructed as a retroflector.

7. A multi-chamber lamp as in claim 1, wherein at least reflectors provided with shield devices have facet-like structured reflection surfaces.

8. A multi-chamber lamp as in claim 1, wherein a frame-like cover apparatus serves as the cover apparatus between the reflector and the closure pane.

9. A multi-chamber lamp as in claim 8, wherein the intermediate pane as well as the cover apparatus have holding means which are self affixing to the lamp housing and covered by a covering part.

10. A multi-chamber lamp as in claim 1, wherein the cover apparatus has a forward surface facing away from the reflection surface of the at least one of the reflectors which is also a reflecting surface similar to the reflecting surface of the at least one of the reflectors.

11. A multi-chamber lamp for vehicles comprising: a lamp housing having a plurality of reflectors, a common closure pane for the reflectors and at least one intermediate pane which extends over an entire light-emergence area of at least one of the reflectors, wherein at least partial areas of the closure pane as well as the at least one intermediate pane are smooth optics-free areas, free of optical functions so as to pass light therethrough without substantially modifying the light to thereby allow a reflection surface of the at least one of the reflectors to be clearly seen therethrough, the at least one intermediate pane supporting a shield device for a light source of the at least one reflector and surrounding the shield device with the smooth optics-free area of the intermediate pane, wherein the at least one reflector is fully surrounded by a cover apparatus which shields an outer peripheral rim of the smooth optics-free area of the at least one intermediate pane and shields an interior of the lamp housing from being viewed from outside the lamp housing;

wherein the shield device carried by the at least one intermediate pane is formed of optical elements.

12. A multi-chamber lamp for vehicles comprising: a lamp housing having a plurality of reflectors, a common closure pane for the reflectors and at least one intermediate pane which extends over an entire light-emergence area of at least one of the reflectors, wherein at least partial areas of the closure pane as well as the at least one intermediate pane are smooth optics-free areas, free of optical functions so as to pass light therethrough without substantially modifying the light to thereby allow a reflection surface of the at least one of the reflectors to be clearly seen therethrough, the at least one intermediate pane supporting a shield device for a light source of the at least one reflector and surrounding the shield device with the smooth optics-free area of the intermediate pane, wherein the at least one reflector is fully surrounded by a cover apparatus which shields an outer peripheral rim of the smooth optics-free area of the at least one intermediate pane and shields an interior of the lamp housing from being viewed from outside the lamp housing;

wherein at least reflectors provided with shield devices have facet-like structured reflection surfaces.

* * * * *